W. J. ARMES.
MILKING MACHINE.
APPLICATION FILED AUG. 11, 1916.
1,361,435.
Patented Dec. 7, 1920.
2 SHEETS—SHEET 2.
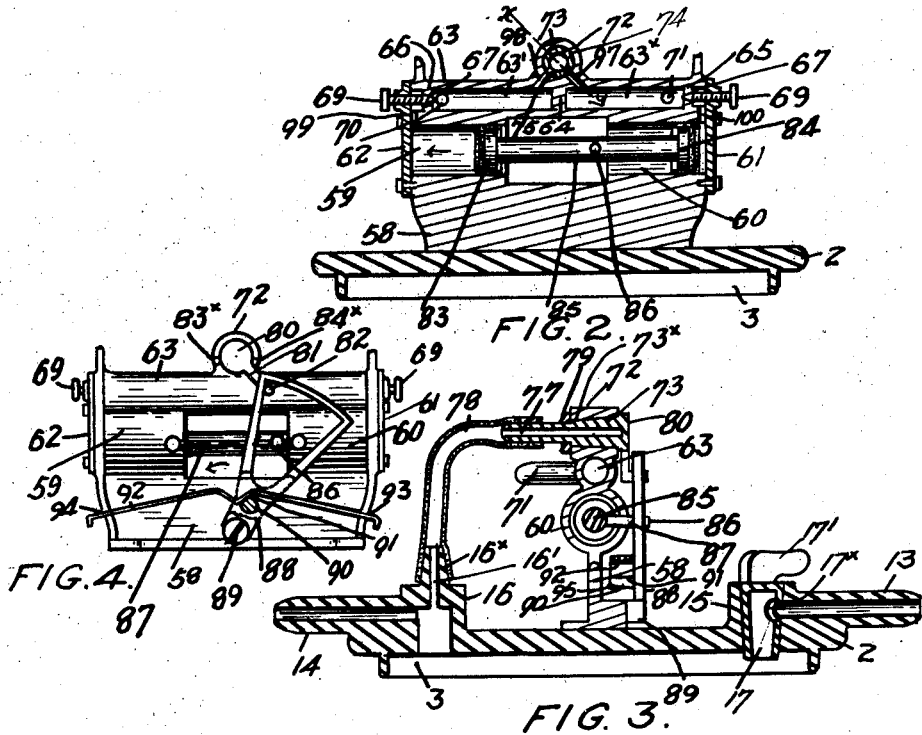
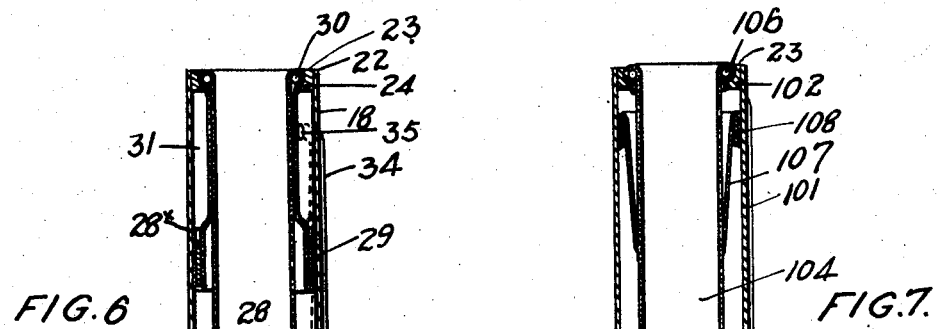
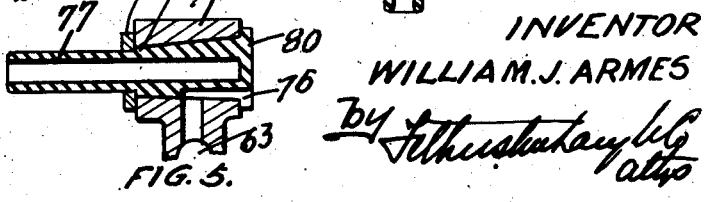
WITNESSES
INVENTOR
WILLIAM J. ARMES

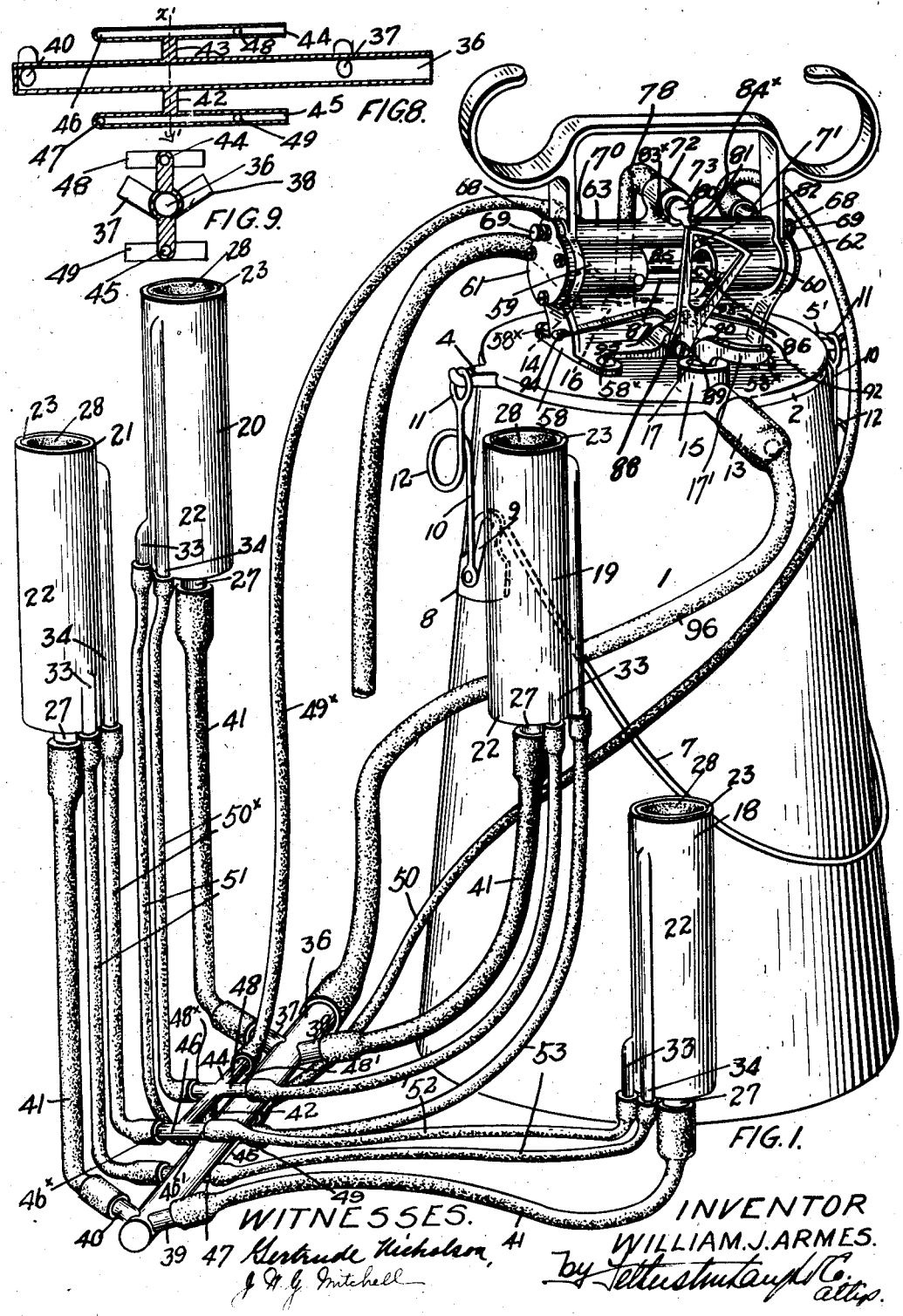

UNITED STATES PATENT OFFICE.

WILLIAM JOHN ARMES, OF HAMILTON, ONTARIO, CANADA.

MILKING-MACHINE.

1,361,435.  Specification of Letters Patent.  Patented Dec. 7, 1920.

Application filed August 11, 1916. Serial No. 114,487.

*To all whom it may concern:*

Be it known that I, WILLIAM JOHN ARMES, of the city of Hamilton, in the county of Wentworth, in the Province of Ontario, Canada, have invented certain new and useful Improvements in Milking-Machines, of which the following is the specification.

My invention relates to improvements in milking machines and the object of the invention is to first improve the construction of the teat cup so that the squeeze will be closely analogous to hand squeeze, secondly to so construct the pulsator that the teats at one side of the cow will be operated to milk while the other side is released and thirdly to provide means to so hold down the cap covering the milk pail and carrying the pulsator that there will be no danger of the vacuum being destroyed while the machine is in use and it consists essentially of the following arrangement and construction of parts as hereinafter more particularly explained by the following specification.

Figure 1 is a general perspective view of my device.

Fig. 2 is a longitudinal section through the main portion of the pulsator and the closing cap of the milk pail.

Fig. 3 is a sectional view at right angles to the section shown in Fig. 2.

Fig. 4 is a side elevation of the pulsator.

Fig. 5 is a sectional view on line $x$—$y$, Fig. 2.

Fig. 6 is an enlarged vertical sectional view through the teat cup.

Fig. 7 is a similar view to Fig. 6 showing an alternative construction.

Fig. 8 is a longitudinal section through my manifold.

Fig. 9 is a cross section on line $x^1$—$y^1$, Fig. 8.

In the drawings like letters of reference indicate corresponding parts in each figure.

1 indicates a milk pail, 2 the cap thereof provided with an annular flange 3 fitting into the pail. 4 and 5 indicate hook lugs extending outwardly from the periphery of the cap 2. 7 indicates a bail forming the pail handle. 8 indicate brackets secured to the side of the pail through which the ends of the bail freely extend. The outer ends of the bail are provided with crank ends 9. 10 indicate links pivotally connected at their lower ends to the ends of the cranks 9 and provided at their upper ends with an eye 11 extending over the hooks 4 and 5. Each of the links 10 is provided intermediately of its length with a spirally bent portion 12 forming a spring tension when the handle of the pail is thrown into the down position or the position it normally assumes during the milking operation. By the downward tension of the spiral portion 12 the cap 2 draws tight against the top of the pail making an air tight closure preventing spoiling of the vacuum.

13 and 14 indicate nipple projections which extend radially from the periphery of the cap 2 in diametrically opposite directions, such nipple projections terminating at their inner ends in hollow bosses 15 and 16 which are open to the interior of the pail at their lower ends. The boss 16 is provided with an upwardly extending segmental nipple projection $16^x$ provided with a small duct $16^1$ extending vertically through the same and entering at its lower end into the center of the hollow boss 16. The interior of the hollow boss 15 is tapered downwardly to form a tapered valve seat and 17 indicates a hollow tapered valve plug fitting within the boss 15 and provided with an orifice $17^x$ normally registering with the inner end of the central duct of the nipple 13. The valve plug 17 is provided with a suitable handle $17^1$.

18, 19, 20, and 21 indicate my teat cups. Each of the teat cups 18, 19, 20 and 21 comprises an outer cylindrical member 22 in the upper end of which an annular ring 23 is suitably secured and provided at its lower interior edge with an inner annular projection 24 having preferably a tapered upper face. 25 indicates an annular ring suitably secured in the lower end of the cylindrical member 22. The lower face of the ring 25 is provided with an interior annular rabbet groove 26, the base of which groove is substantially V-shape in form thereby forming a depending V-shaped annular portion $26^x$. 27 indicates a nipple member provided with an enlarged upper end $27^x$ substantially fitting at its upper end the upper end of the ring 25. $27^1$ indicates an annular enlargement formed on the outer periphery of the enlargement $27^x$, the upper face of which is formed V-shape so as to fit into the V-shaped base of the groove 26. 28 indicates a tube of thin resilient rubber. 29 indicates a split ring which fits within the member 22. The end $28^x$ of the rubber tube 28 is inserted through the lower end of the tubular member and the ring 29 sprung thereover so as to secure the end 28× within the tube intermediately of its length, the opposite end of the tube being drawn longitudinally through the tube 28.

30 indicates a ring which is then inserted in the tube 28 and forced longitudinally through the tube against the shoulder 24. The free end of the tube 28 is then passed through the ring 30 and returned longitudinally through the member 22 and through the ring 25. The enlarged end 27× of the nipple 27 is forced into the end of the tube 28 and the portion 27¹ of the nipple against the portion 26× of the ring 25 so as to grip the rubber tube therebetween thus securing that end of the rubber tube in position. By this means an upper annular chamber 31 and lower annular chamber 32 is formed between the tube 28 and the tubular member 22. 33 indicates a nipple depending from the periphery of the tubular member 22 and opening at its upper end into the lower annular chamber 32. 34 indicates a depending nipple which extends upwardly in tubular form longitudinally of the member 22 and is provided at its upper end with an opening 35 entering the upper tubular chamber 31. 36 indicates a tubular manifold provided with laterally extending branches 37, 38, 39 and 40. Each branch 37, 38, 39 and 40 is connected by a flexible tube 41 to a nipple 27 of a teat cup 18, 19, 20 or 21. 42 and 43 indicate vertical posts extending from the manifold 36 intermediately of its length. 44 and 45 indicate longitudinal ducts extending at right angles to the posts 42 and 43 and parallel with the body of the manifold 36. 46 and 47 indicate branch ducts extending at right angles to the ducts 44 and 45 at one end thereof. The opposite ends of the ducts 44 and 45 are open. 48 and 49 indicate branch ducts similar to the branch ducts 46 and 47 extending at right angles to the ducts 44 and 45 intermediately of their length. 49× and 50 indicate flexible tubes extending from the open ends of the ducts 44 and 45. The ends 48× and 46× of the ducts 48 and 46 are connected by flexible tubes 50× to the nipples 34 of the cups 20 and 21. The corresponding end of the ducts 49 and 47 are connected by flexible tubes 51 to the lower end of the nipples 33 of the cups 20 and 21. The ends 48¹ and 46¹ of the ducts 48 and 46 are connected by flexible tubes 52 to the nipples 33 of the cups 18 and 19. The corresponding ends of the ducts 47 and 49 are connected by flexible tubes 53 to the nipples 34 of the cups 18 and 19. By this arrangement it will be seen that the tube 44 is connected to the upper chambers 31 of the cups 20 and 21 and to the lower chambers of the cups 18 and 19 and that the tube 46 is connected to the upper chambers of the cups 18 and 19 and the lower chambers of the cups 20 and 21.

It will thus be seen that by alternately connecting the tubes 49× and 50 to the vacuum source that the annular chambers of the cups 18 and 19 will operate alternately with the annular chambers of the cups 20 and 21, that is to say, when the upper chambers of the cups 18 and 19 are in vacuo the upper chambers of the cups 20 and 21 will be connected to the atmosphere and vice versa and similarly when the chambers 32 of the cups 18 and 19 are in vacuo the chambers 32 of the cups 20 and 21 are open to the atmosphere and vice versa.

I will now describe the means by which the vacuum source is alternately connected to the tubes 49 and 50.

58 indicates a base bracket secured to the upper face of the cover by screws 58×. 59 and 60 indicate opposing cylinders formed integral with the bracket 58, such cylinders being open at each end. 61 and 62 indicate closing caps for the open outer ends of the cylinders 59 and 60. 63 indicates a duct formed integral with the members 59 and 60 and extending longitudinally thereof and provided centrally of its length with a dividing partition 64 and in proximity to each end with dividing partitions 65 and 66 having tapered valve seats 67 formed centrally therein. 68 indicates an extension to each of the caps 61 and 62. 69, 69 indicate needle valves extending through such extension 68, the needle ends of which co-act with the tapered seats 67 hereinbefore described. 70 and 71 indicate nipples extending from each end of the duct 63 at right angles thereto and communicating with the ends of such duct. The flexible tube 49× is inserted over the nipple 70, the flexible tube 50 over the nipple 71, thereby forming a connection between the portions 63× and 63¹ of the duct 63 respectively and the ducts 44 and 45 of the manifold 36. 72 indicates a valve body formed integral with the body of the duct 63, The valve body 72 is hollow so as to form a tapered valve seat. 73 indicates a hollow tapered valve plug fitting within the body 72 and provided with diametrically opposite openings 74 and 75 extending through the wall thereof and a longitudinally extending groove 76 (see Fig. 5). The central portion of the valve plug is provided with an extension 77 forming a nipple. 78 indicates a flexible tube connected at one end to the nipple 16× and at the opposite end to the nipple 77. 79 indicates an annular plate suitably secured to the body 72 of the valve and surrounding the nipple end 77 so as to fit against the shoulder 73× of the valve plug 73. The opposite end of the valve is provided with an enlarged head 80 from which extends an arm 81 having an out-turned lower end 82. 83× and 84× indicate limiting stops extending from the body 72 of the valve at each side of the arm 81. 83 and 84 indicate a pair of pistons, the piston 83 operating in the cylinder 59 and the piston 84 in the cylinder 60. 85 indicates a piston rod connecting the pistons 83 and 84 together.

86 indicates a pin extending outwardly from the piston rod 85. 87 indicates a guiding rod secured at its ends to the walls of the cylinders 59 and 60 and extending freely through the pin 86 thereby keeping the pin 86 always in a horizontal position. 88 indicates a rocking arm pivotally mounted at its lower end at 89 in the base bracket 58. The rocking arm 88 is flared outwardly toward its free end and is provided preferably with a hollow central portion into which the projecting portion of the arm 81 and the pin 86 extend.

90 indicates a projection extending inwardly from the arm 88 in proximity to its lower end, such projection being provided with an upwardly extending angular portion 91 forming a knife edge. 92 indicates a spring, inverted broad V-shape in form and slidably supported at its ends in the base bracket 58 at 93 and 94. The central portion or apex of the V-spring is depressed so as to form a depending V-shape projection 95, the face of which bears normally against the opposing face of the V-shaped projection 91. 96 indicates a tubular connection between the nipple projection 13 and the manifold 36. 97 and 98 indicate angularly set ducts extending from the interior of the valve body 72 at an angle preferably of 45 degrees respectively into the chambers 63× and 63¹ of the duct 63. 99 and 100 indicate ducts connecting the outer ends of the duct 63 at the outside of the partition walls 65 and 66 with the ends of the cylinders 59 and 60.

Having described the principal parts involved in my invention I will briefly describe the operation of the same.

In starting the operation the vacuum is first connected to the nipple 14 leading to the pail by opening a suitable valve in the main tube to which the nipple 14 is connected, thus connecting the vacuum to the pail, to the chambers 63¹ and 63× and tubes leading therefrom to the vacuum chambers of the cups. The teats of an animal are then inserted in the teat cups 18, 19, 20 and 21 in the usual manner, that is by creating suction in the cup by opening the valve 17. Upon opening the valve 17 the vacuum tension extends through the nipple 13 from the pail 1 through the tube 96 to the manifold 36 and through the manifold and branches 37, 38, 39 and 40 and tubes 41 leading therefrom and nipples 27 to the interior of the teat cups containing the teats. Normally the valve 73 is set so that either the chamber 63× or 63¹ is in communication with the interior thereof. In the drawing the chamber 63¹ is shown in connection with the interior of the valve 73. When the mechanism is so arranged the vacuum tension extends through the duct 16¹, tube 78, interior of the valve 73 through the opening 75, duct 98, duct chamber 63¹, nipple 70, tube 49×, tubular duct 44 to the branch ducts 46 and 48, the left hand ends of which are connected by the tubes 50× to the upper chambers 31 of the cups 20 and 21 and the opposite ends by the tubes 52 to the lower chambers 32 of the cups 18 and 19 thus drawing the upper portion formed by the flexible outer wall of the central tubular chamber of the cups 20 and 21 outwardly and the wall 28 of the lower chambers 32 of the teat cups 18 and 19 outwardly into their normal vertical position. Simultaneously with this operation the suction on the upper chambers 31 of the cups 18 and 19 and lower chamber 32 of the cups 20 and 21 is released by air passing through groove 76, duct 97, chamber 63×, tube 50, duct 45, branch ducts 47 and 49 and tubes 53 and 51 leading to the upper chambers of the teat cups 18 and 19 and lower chambers of the teat cups 20 and 21, thus admitting atmospheric pressure into the lower chambers 32 of the teat cups 20 and 21, and the upper chambers 31 of the teat cups 18 and 19. Under these conditions as there is continuous suction on the central teat chamber 28 of all teat cups the atmospheric pressure in the lower chambers 32 of the teat cups 20 and 21 causes the wall 28 of these cups to close inwardly about the corresponding teats, also the suction in the upper chambers 31 of these teat cups tends to draw the inner wall of these chambers outwardly against the outer casing, so that the atmospheric pressure existing in chambers 32 extends upwardly between the walls of chambers 31 and 32, thus causing the wall 28 to close in about the entire length of the teat. Thus, in this position relief occurs upon the teats in cups 20 and 21. Further in this position the atmospheric pressure in the upper chambers 31 of cups 18 and 19 causes pressure on the upper portion of the corresponding teats and the suction in the lower chambers 32 of these cups tends to draw the lower portion of wall 28 outwardly away from the teats so that milk is drawn downwardly from the corresponding teats by vacuum into the lower portion of the chamber from which it is drawn by the vacuum to the pail through the tube 41 to the manifold 36 from whence it passes through the tube 86 to the interior of the pail. Thus in this position there is relief in teat cups 20 and 21 and milking in teat cups 18 and 19. Under these conditions also the vacuum tension passes from the chamber 63¹ through the valve orifice 66, duct 99 into the cylinder 59 thus gradually drawing the piston 83 in the direction of arrow, the piston 84 being relieved by air passing through the groove 76, duct 97 into the duct chamber 63ˣ and through the valve opening 67 and duct 100 into the cylinder 60 at the back of the piston.

As the piston 83 is drawn in the direction of arrow the pin 86 engages with one side of the hollow interior of the arm 88. As soon as it comes into engagement with such arm it swings the arm in a corresponding direction carrying the apex or knife edge of the projection 90 opposite the apex of the V-shape projection of the spring 92 thereby forcing the spring 92 upwardly into tension. Immediately the apex of the projection 90 passes the apex of the projection 95 the downward tension of the spring forces the arm quickly in the direction of arrow (see Fig. 4) so that the opposite side of the hollow interior of the arm 88 strikes against the outwardly projecting portion 82 of the valve arm 81 swinging the valve arm over so as to carry the valve plug into such a position that the orifice 74 thereof is opposite the inclined duct 97, and the groove 76 opposite the inclined duct 98. By this means the upper chamber of the teat cups 20 and 21 are in connection, as hereinbefore described, with the duct chamber 63¹ so that they are relieved by air passing through the groove 76 and inclined duct 98 into such chamber 63¹. Simultaneously the duct chamber 63ˣ is placed in connection with the vacuum source through the inclined duct 97 and valve orifice 74 so as to produce a suction through the tube 50 communicating with the upper chambers of the cups 18 and 19 and the lower chambers of the cups 20 and 21 thereby distending the lower portions of the interior rubber walls of the cups 20 and 21 and the upper portions of the rubber walls of the cups 18 and 19, when the lower portions of the interior walls of the cups 18 and 19 and the upper portions of the interior walls of the cups 20 and 21 are released. Simultaneously with this operation the vacuum tension extends from the duct chamber 63ˣ through the orifice 100 into the cylinder 60 so as to draw the pistons 83 and 84 in the opposite direction to the arrow. By this operation it will be readily seen that a pulsating action takes place so as to alternately operate the upper and lower chambers of the teat cups on each side of the udder of a cow at the same time operating the upper and lower chamber of each teat cup so as to produce a similar action to that employed by hand when manually milking a cow and at the same time insuring that the vacuum tension will remain uniform and be undestroyed by leakage into the milk pail between the closing cap and the top of the pail.

In Fig. 7 I have shown an alternative construction of teat cup. In this form 101 indicates an outer cylindrical member provided at its upper and lower end with rings 102 and 103 similar in construction to the rings 23 and 25 described in connection with Fig. 6. 104 indicates a rubber tube which is secured by a nipple 105 in a similar manner as the lower end of the tube is secured by the nipple 27 (see Fig. 6). The upper end of the tube in Fig. 7, however, terminates after it is wrapped around the ring 106 which corresponds to the ring 30 in Fig. 6. The upper and lower chambers of the teat cup in this construction are formed by an annular flap 107 which is secured at its lower end to the central tube and extends freely upwardly to the interior wall of the outer tube against which it is secured by an annular ring 108. The nipples 109 and 110 are provided similar to the nipples 33 and 34 communicating with the upper and lower chambers of the teat cup.

If desired the teat cup might be constructed with a plurality of annular vacuum chambers which may be operated successively so as to produce a gradual downward squeeze upon the teat of the cow which would still further make the operation analogous to the operation of the hand.

The valves 69 are provided so as to control the suction passing to the cylinders 59 and 60 thereby regulating the speed at which the pistons 83 and 84 travel and consequently the speed at which the pulsating operation takes place in the vacuum chambers 31 and 32.

What I claim as my invention is:

1. In a milking machine, the combination with the closed milk pail and vacuum duct leading thereto, of a plurality of teat cups each provided with a flexible resilient wall forming a teat chamber connected to the milk pail, an upper and lower vacuum chamber surrounding said teat chamber, and means for alternately connecting the upper and lower chambers with the vacuum of the pail and the atmosphere and the lower chamber with the vacuum of the pail and the atmosphere alternately with the operation of the upper chamber.

2. In a milking machine, the combination with the closed milk pail and vacuum duct leading thereto, of a pair of teat cups co-acting with the teats on one side of a cow and a pair of teat cups co-acting with the teats on the opposite side of a cow, a flexible resilient wall forming the teat chamber of each cup, a duct connecting the teat chambers with the milk pail, an upper and lower vacuum chamber surrounding the teat chamber of each cup, means for alternately connecting and releasing each vacuum chamber with the vacuum of the milk pail, and means for alternating the operation of the teat cups on one side of the cow with the teat cups on the opposite side of the cow.

3. In a milking machine, the combination with the closed milk pail and vacuum duct leading thereto, of a plurality of teat cups each comprising a flexible resilient wall forming a teat chamber, and upper and lower vacuum chambers surrounding each teat chamber, a duct leading from the teat chambers to the pail, and a duct extending from one vacuum chamber of each cup, a common duct into which these ducts lead, a duct extending from the other vacuum chamber of each teat cup, a common duct into which these other ducts lead, and means for automatically alternately opening and closing the common ducts to be alternately in communication with the vacuum of the pail and the atmosphere.

4. In a milking machine, the combination with the closed milk pail and vacuum duct leading thereto, of a plurality of teat cups each comprising an inner teat chamber having a flexible resilient wall and upper and lower surrounding vacuum chambers, a pair of tubes each having a pair of branches extending from each side thereof, means for connecting the branches on one side of one tube with the upper vacuum chamber of the teat cups on one side of the cow and the branches extending from the opposite side of the tube with the lower vacuum chamber of the teat cups on the opposite side of the cow, and means for connecting the branches of the other tube with the alternate vacuum chambers of the teat cups, a pipe connection leading from each of such tubes, means for alternately connecting such pipes with the vacuum of the pail, and the atmosphere, and a pipe connection between the teat chambers and the pail.

5. In a milking machine, the combination with the closed milk pail and vacuum duct leading thereto, a main vacuum pipe leading therefrom, a plurality of teat cups each provided with an inner teat chamber formed by a flexible resilient wall and upper and lower chambers surrounding each teat chamber, a manifold tube to which the opposite end of the main vacuum tube is connected, branches extending from the manifold tube, a pipe connection between each of such branch tubes and the teat chamber of a teat cup, and means for automatically alternately connecting the upper and lower vacuum chambers with the interior of the pail and the atmosphere.

6. In a milking machine, the combination with the closed milk pail and vacuum duct leading thereto, a main vacuum pipe leading therefrom, a plurality of teat cups each provided with an inner teat chamber formed by a flexible resilient wall and upper and lower chambers surrounding each teat chamber, a manifold tube to which the opposite end of the main vacuum tube is connected branches extending from the manifold tube, a pipe connection between each of such branch tubes and the teat chamber of a teat cup, supplemental upper and lower tubes carried by the manifold tube, branches extending laterally from each supplemental tube and from each side thereof, pipe connections between the branches extending from one side of the upper tube and the upper vacuum chambers of the teat cups on the corresponding side of the cow, pipe connections from the corresponding side of the lower tube to the lower vacuum chambers on the corresponding side of the cow, pipe connections between the branches on the opposite side of the upper tube and the lower vacuum chambers of the teat cups on the opposite side of the cow and pipe connections between the branches extending from the opposite side of the lower supplemental tube and the upper vacuum chambers of the teat cups on the corresponding side of the cow and a duct connection between each supplemental tube and the interior of the pail, and valve means for alternately automatically closing such connection and opening it to the atmosphere.

7. In a milking machine, the combination with a plurality of teat cups each provided with an inner chamber having flexible resilient walls and surrounding upper and lower vacuum chambers, of a manifold tube provided with branch tubes, a pipe connection between each branch tube and the inner chamber of each teat cup, upper and lower supplemental tubes carried by the manifold tubes and connected to a vacuum source, branch tubes extending from each side of the upper and lower supplemental tubes, a pipe connection between the branch pipes on one side of the upper supplemental tube and the upper vacuum chambers of the teat cups on the corresponding side, a pipe connection between the branch tubes on the corresponding side of the lower supplemental tube and the lower vacuum chambers of corresponding teat cups, a pipe connection between the branch pipes extending from the opposite side of the lower supplemental tube and the upper vacuum chambers of the teat cups on the corresponding side, and a pipe connection between corresponding branch pipes of the upper supplemental tube and the lower vacuum chambers of the corresponding teat cups.

8. In a milking machine, the combination with the closed milk pail and vacuum duct leading thereto, of a plurality of teat cups each provided with upper and lower vacuum chambers, ducts leading from the pail to a vacuum chamber of the teat cups on one side of a cow and ducts leading from the pail to a vacuum chamber of the teat cups on the opposite side of the cow, and automatic means operated by the vacuum within the pail for alternately connecting said ducts with the vacuum and the atmosphere.

9. In a device of the class described, the combination with the closed milk pail and vacuum duct leading thereto, of a pair of duct chambers, vacuum tubes leading therefrom, a pair of opposing cylinders, pistons located therein, a piston rod connecting the pistons together, means for causing the piston and rod to move automatically in alternate directions, a rocking valve designed to alternately connect the duct chambers with the vacuum of the pail and with the atmosphere, an arm extending radially from the valve plug of such rocking valve and having an outwardly extending projection at its outer end, a suitably mounted rocking arm having portions at each side thereof in proximity to its outer or free end with which the outwardly projecting portion of the valve arm co-acts, a pin extending outwardly from the piston rod also co-acting with the pivoted arm, a projection extending inwardly from such arm having a V-shaped portion extending longitudinally thereof, and resilient means having a V-shaped projection bearing against the aforesaid V-shaped portion and past which the first mentioned projection is sprung by the longitudinal movement of the piston and pin carried thereby co-acting with the arm carrying such projection.

10. In a device of the class described, a teat cup comprising an outer open ended casing, an inner flexible wall secured to the two ends of the casing and forming therein a central teat chamber and an annular chamber surrounding said teat chamber, a second flexible wall within said annular chamber having its upper end secured to the upper end of the casing and its lower end secured to the casing intermediately of the length thereof so as to form a second annular chamber within the above mentioned annular chamber and in the upper portion thereof, means for producing vacuum and atmospheric pressure alternately in the annular chambers so arranged that a period of vacuum in one chamber coincides with a period of atmospheric pressure in the other, the two annular chambers being so disposed that the atmospheric pressure in the lower chamber extends the full length of the central teat chamber and means for producing constant vacuum in the central teat chamber.

WILLIAM JOHN ARMES.

Witnesses:
GERTRUDE NICHOLSON,
LAURA BOWRON.